United States Patent [19]

Rollins

[11] Patent Number: 4,811,012

[45] Date of Patent: Mar. 7, 1989

[54] ELECTRONIC LOCKING SYSTEM

[75] Inventor: Joseph M. Rollins, Billerica, Mass.

[73] Assignee: Emhart Industries, Inc., Hartford, Conn.

[21] Appl. No.: 7,843

[22] Filed: Jan. 28, 1987

[51] Int. Cl.⁴ .............................................. H04Q 1/00

[52] U.S. Cl. ............................ 340/825.31; 235/382.5; 340/825.34

[58] Field of Search ........................ 340/825.3–825.34; 361/171, 172; 70/277, 278; 235/382, 382.5

[56] References Cited

U.S. PATENT DOCUMENTS 4,177,657 12/1979 Aydin .................................. 70/278

4,209,782 6/1980 Donath et al. .................... 70/278 X 4,415,893 11/1983 Roland et al. .................. 340/825.31

*Primary Examiner*—Ulysses Weldon

*Attorney, Agent, or Firm*—Carl A. Forest

[57] ABSTRACT

An electronic locking system comprises an electronic lock for an external door of a building, and a plurality of electronic locks associated respectively with internal doors of a building accessed via the external door. The lock of each internal door includes means for storing at least one unique lock combination code and the lock of the external door including means for storing a plurality of the unique lock combination codes of a plurality of the internal doors and/or a common combination code. Key cards operate the locks. A first control means operable if the number of internal doors accessed through the external door is less than a predetermined number designates a unique lock combination for each internal door and encodes the associated key card with the unique lock combination. A second control means operable if the number of internal doors exceeds the predetermined number provides an overload signal recognizable by an operator. The second control means also may be operable if the number of internal doors exceeds the predetermined number for designating the external door as a common pass door and encoding each of the key cards with a unique lock combination code associated respectively with one of the internal doors and a common lock combination code associated with the external door.

1 Claim, 5 Drawing Sheets

FIG. 1
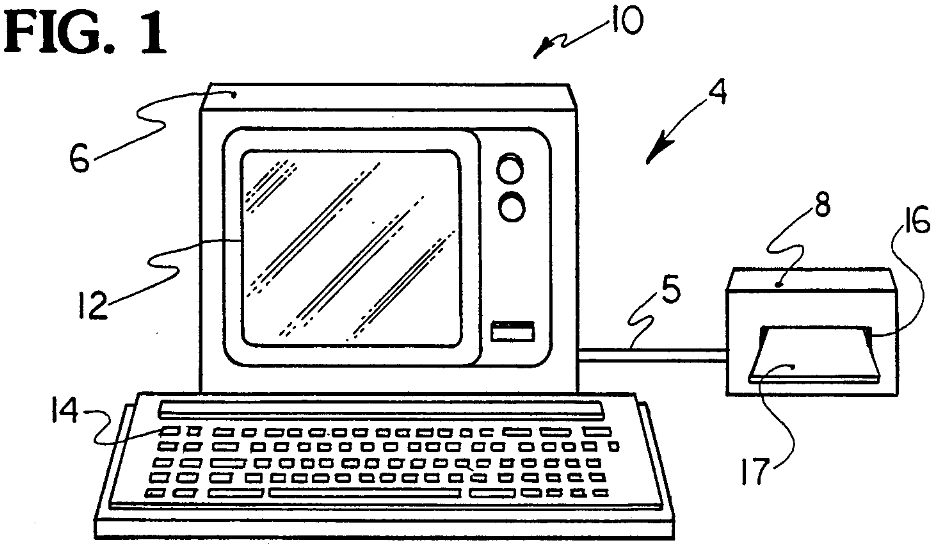
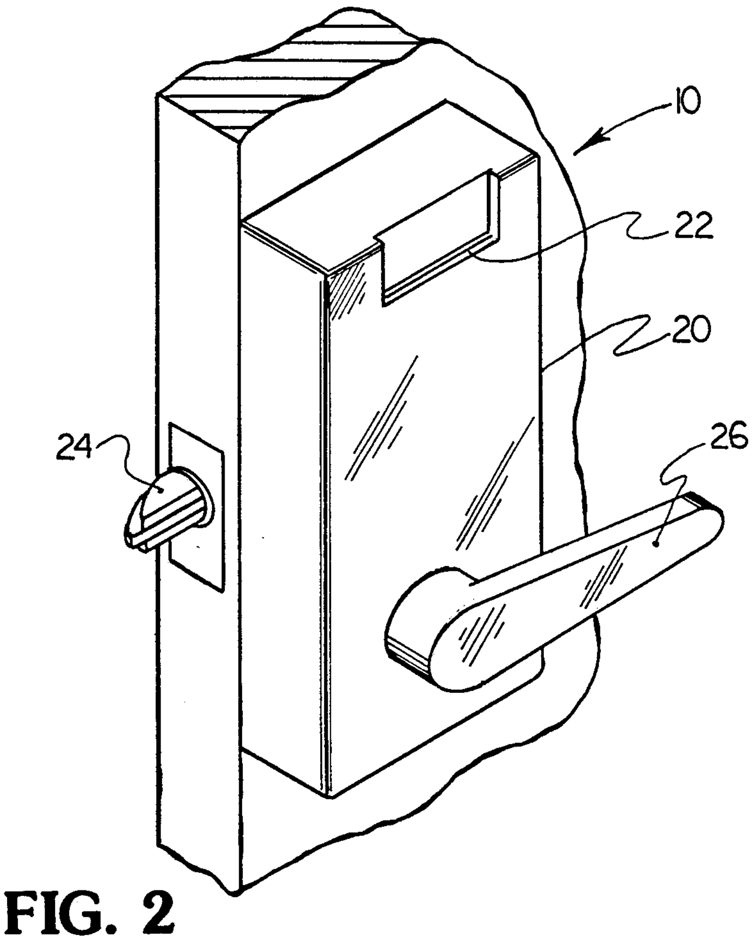
FIG. 2

FIG. 8
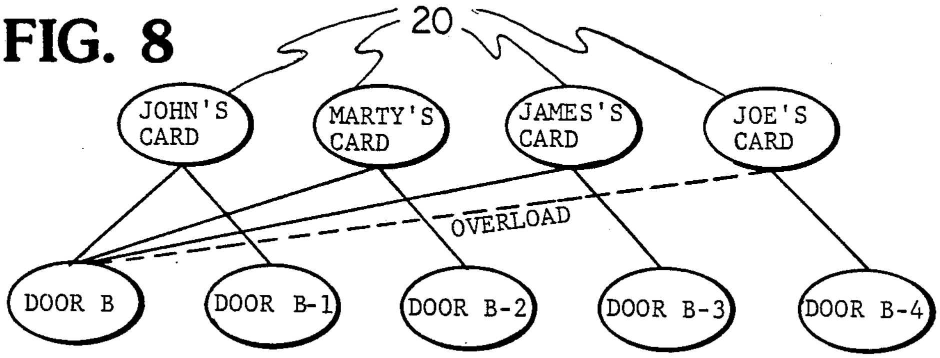
FIG. 5
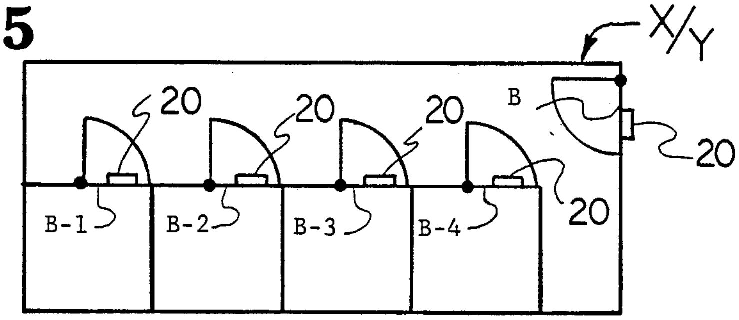
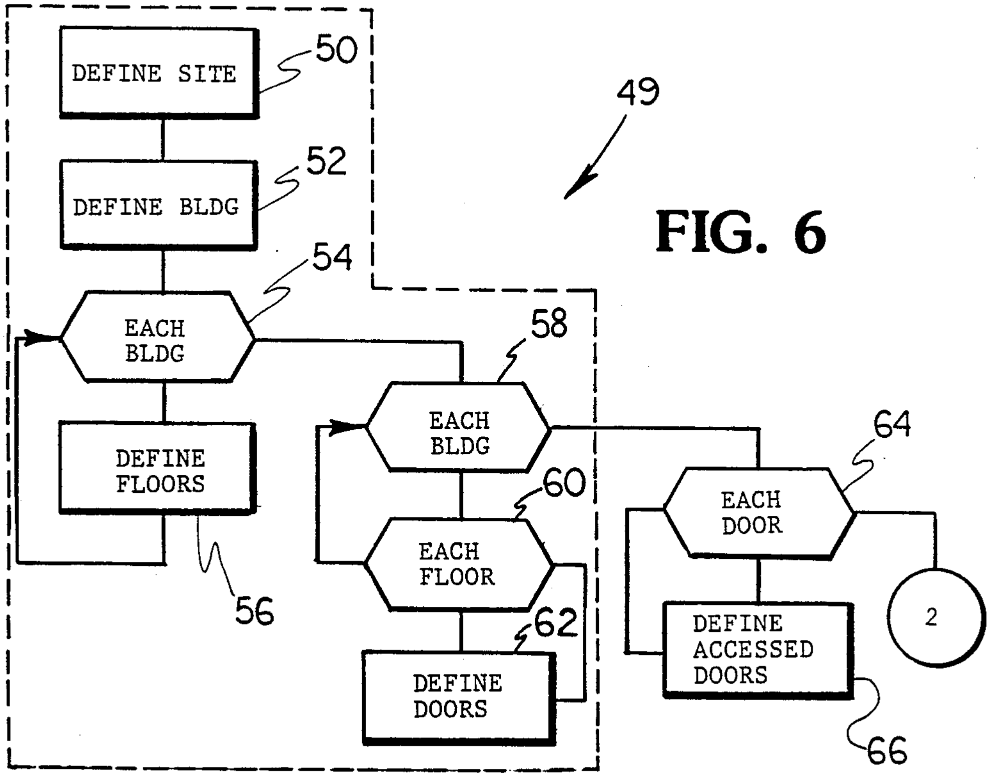
FIG. 6

FIG. 9a
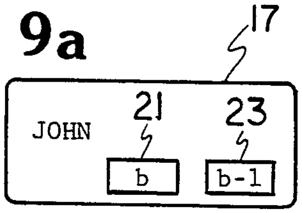
FIG. 9b
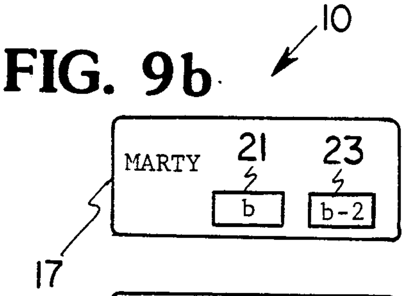
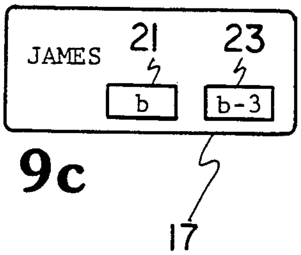
FIG. 9c
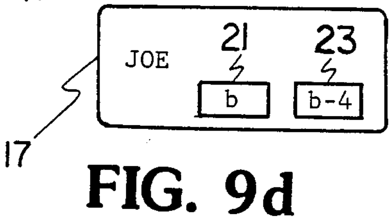
FIG. 9d
FIG. 10
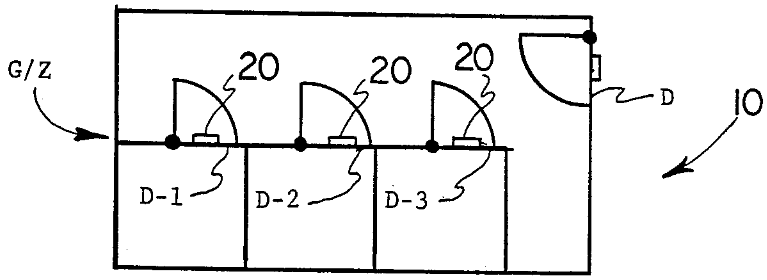
FIG. 11a
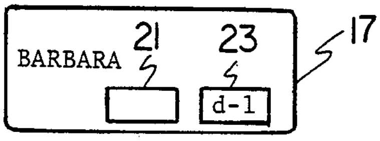
FIG. 11b
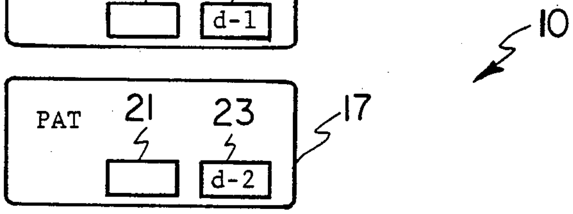
FIG. 11c
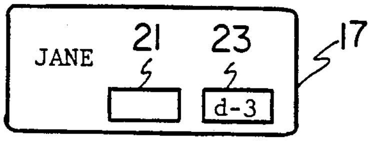

ELECTRONIC LOCKING SYSTEM

BACKGROUND OF THE INVENTION

The invention relates generally to electronic locking systems and deals more particularly with a management system for coding key cards and associated electronic locks to suit a variety of floor plans while providing substantial security and low maintenance.

Electronic locking systems previously known include key cards having magnetic data bits which represent a lock combination and other data, a central computer, a key card encoder for utilizing the data on the key cards, and a multiplicity of electronic locks. Each of the locks is equipped with a reader to read the magnetic data bits on the card and a microprocessor to process the data. If the lock access code matches a lock combination, the lock may be opened.

Electronic memory in the lock contains a plurality of the lock combinations associated respectively with a plurality of access levels. For example, in a hotel application, one combination stored in the lock may correspond to a key issued to a hotel patron and another combination may correspond to a key issued to a maid. There are drawbacks to this type of system. The number of combinations stored in the lock may be limited to comply with the memory capacity of such locks and security requirements. Even if a large number of combinations could be stored in each lock then the chance that a random, unauthorized card will contain one of such combinations is intolerably high. In addition, the key cards have limited data capacity.

In a difficult environment such as a dormitory where, for example, there is a locked external door controlling access to a common hallway and a plurality of locked internal dormitory rooms adjacent to the hallway, it may be desirable that the resident in each dormitory room have a key card which opens both the external door and the internal door leading to one dormitory room. In a previous known electronic locking system, each key card issued to a dormitory room resident had a unique code, each internal door lock stored the unique code of the resident, and the external door lock stored all the unique codes of all the residents.

Another previously known locking system adapted to a hotel includes a plurality of key cards. Each of the cards has a site code and a lock combination code. The site code unlocks all common doors at the site such as doors leading to a laundry room and the lock combination code unlocks only one individual door such as a dormitory room door. One problem with this system is that if one card is lost, the lock combinations in all the common doors must be changed to make the lost card inoperative and new cards must be issued to all of the card holders in order to maintain security.

Accordingly, a general object of the present invention is to provide an electronic, locking system which is flexible enough to allow card holders to have access through a plurality of doors having locks without jeopardizing the security of the system or requiring extensive replacement of key cards when a lock combination is changed.

A more specific object of the present invention is to provide a management system within the foregoing electronic locking system to encode key cards and designate lock combinations stored in associated locks.

Another specific object of the present invention is to provide an electronic locking system of the foregoing type which utilizes key cards and electronic locks having limited memory capability.

Other objects and advantages of the invention will become apparent from the following Detailed Description of the Preferred Embodiments and Claims.

SUMMARY OF THE INVENTION

The invention resides in an electronic locking system comprising an electronic lock for an external door of a building, and a plurality of electronic locks associated respectively with internal doors of the building accessed via the external door. The lock of each internal door includes means for storing a unique lock combination code and the lock of the external door including means for storing a plurality of the unique lock combination codes of a plurality of the internal doors and/or a common combination code A plurality of key cards within the system is readable by the electronic locks. The key cards contain the codes and each of the key cards opens associated electronic locks when the key card is inserted in the lock and the code on the card corresponds to a combination stored in the lock. The system also includes a first control means operable if the number of internal doors accessed through the external door is less than a predetermined number for designating a unique lock combination for each internal door and encoding the associated key card with the unique lock combination.

According to one feature of the invention, the system includes a second control means operable if the number of internal doors exceeds the predetermined number for providing an overload signal recognizable by an operator.

According to another feature of the invention, the second control means is operable if the number of internal doors exceeds the predetermined number for designating the external door as a common pass door and encoding each of the key cards with a unique lock combination code associated respectively with one of the internal doors and a common lock combination associated with the external door.

According to another feature of the invention, each key card contains two field regions, one to record one of the unique lock codes and the other to record the common lock code.

BRIEF DESCRIPTION OF THE FIGURES

FIG. 1 is a schematic, perspective view of a central computer and a key card encoder of an electronic locking system which embodies the present invention.

FIG. 2 is a schematic, plan view of an electronic lock of the locking system of FIG. 1.

FIG. 5 is a floor plan of a building in which the electronic locking system of FIG. 1 may be installed.

FIG. 6 is a flowchart illustrating the process by which an operator utilizes the computer of FIG. 1 to define the buildings, floors and doors controlled by the electronic locking system of FIG. 1.

FIG. 8 is a diagram illustrating the adaptation of the flowchart of FIG. 7 to the floor plan of FIG. 5.

FIGS. 9(*a–d*) are schematic diagrams of key cards of the electronic locking system of FIG. 1 corresponding to the floor plan of FIG. 5.

FIG. 10 is another floor plan of a building in which the electronic locking system of FIG. 1 may be installed.

FIGS. 11(*a–c*) are schematic diagrams of key cards of the electronic locking system of FIG. 1 corresponding to the floor plan of FIG. 10.

DETAILED DESCRIPTION OF THE PREFERRED EMBODIMENT

Figure 3:
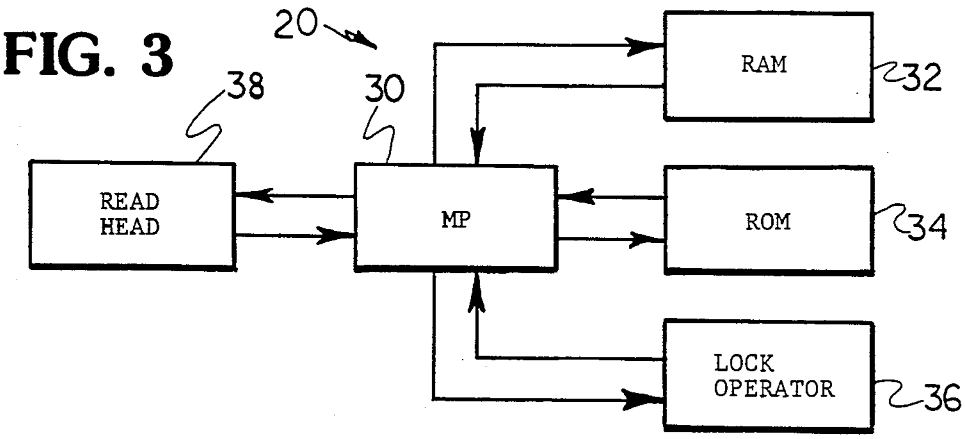
FIG. 3 is a block diagram of electronic circuitry within the electronic lock of FIG. 2.

Turning now to the drawings, FIG. 1 illustrates a computer 6 and a key card encoder 8 of an electronic locking system generally designated 10 which embodies the present invention. The computer 6 is a general purpose, personal computer and includes a video monitor 12 and a keyboard 14. The computer 6 is electrically connected to the encoder 8 via a cable 5 which encoder includes a recess 16 for receiving key cards 17, 17 to be encoded. The encoder 8 also includes components for reading data from the card. Together the computer 6 and the key card encoder 8 form a management system 4.

FIG. 2 illustrates one of a plurality of electronic locks 20 of the electronic locking system 10. The electronic lock 20 includes a recess 22 for receiving the key card 17, a latch bolt 24 and a handle 26 for manipulating the latch bolt 24.

FIG. 3 illustrates electronic hardware and firmware within the electronic lock 20 which hardware includes a microprocessor 30, a random access memory (RAM) 32 for storing lock combinations, a read only memory (ROM) 34 for storing an operating program, a lock operator 36 and a read head 38 for reading the key card 17. By way of example, the microprocessor 30 is a Hitachi Model 6305X2. The lock operator 36 includes a solenoid which manipulates a locking mechanism.

Figure 4:
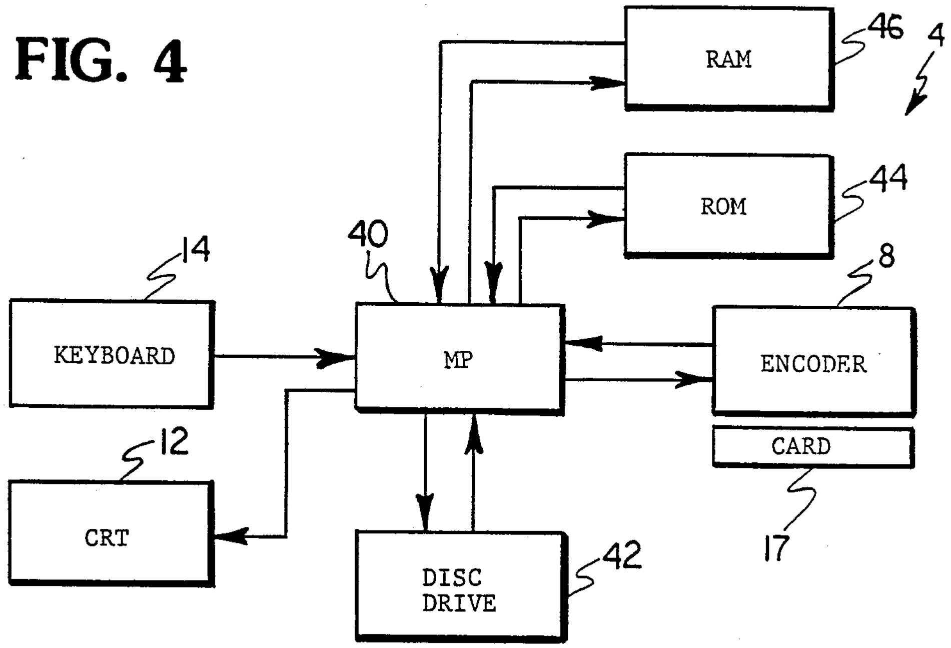
FIG. 4 is a block diagram of electronic circuitry within the computer and card encoder of FIG. 1.

FIG. 4 illustrates components of the management system 4 and their interconnection. The computer 6 includes a microprocessor 40 which is supplied by a disc drive 42, a ROM 44 to provide a portion of the operating program and a RAM 46 to provide working memory. FIG. 4 also illustrates data flow from the keyboard 14 to the microprocessor 40, from the microprocessor 40 to the video monitor 12 and between the microprocessor 40 and the card encoder 8. Information flows primarily from the microprocessor 40 to the card encoder 8 during writing operations and information flows in the reverse direction during reading operations.

FIG. 5 illustrates a floor plan of a floor Y in a building X. The floor Y is accessed through a common, external door B which opens into a hallway H. The hallway H leads to four private rooms which are accessed individually by respective internal doors B-1, B-2, B-3, and B-4. Each of the doors B, B-1, B-2, B-3 and B-4 is equipped with one of the electronic locks 20 as part of the electronic locking system 10. It should be clearly understood that the electronic locking system 10 is flexible enough to serve a wide variety of buildings and floor plans and the floor plan illustrated in FIG. 5 is but one example. In such a floor, it may be desirable that the occupant of each room have a key card which provides access through the door B and one of the doors B-1 through B-4, and that each key card be unable to access any of the other internal doors. By way of example, each of the doors B, B-1, B-2, B-3 and B-4 is adapted to store up to three lock access combinations. Also, by way of example as illustrated in FIG. 9, each key card 17 is adapted to store two lock combinations, one being written in a field portion 23 of the card associated with individual door codes and the other being written in another field portion 21 of the card associated with common pass door codes.

FIG. 6 is a flowchart 49 illustrating a process by which an operator programs the management system 4 to define the layout of doors having the electronic locks 20, 20 within a building or group of buildings at a site equipped with the electronic locking system 10. First, the operator identifies the site, for example, Green University, by a suitable entry through the keyboard 14 (step 50). Next, the operator identifies each building within the site, for example, Geology building, Gymnasium, and Building X (step 52). Then, for each building (step 54), the operator enters into the computer 6 the name of each floor, for example, Floors Y and Z of building X (step 56). After the floors of each building have been identified, the operator enters into the computer the name of each door of each floor of each building (steps 58, 60 and 62), and in the illustrated example, Building X, Floor Y contains doors B, B-1, B-2, B-3 and B-4. In addition, in the steps 58, 60 and 62, the operator inputs to the computer the type of each door, internal or external. External doors are ones with electronic locks which lead to the outside of the building either directly or through other doors not containing an electronic lock 20 within the system 10. All other doors containing an electronic lock are internal doors. Then, for each door, the operator inputs to the computer the doors which are accessed by the door under consideration (steps 64 and 66). For example, for the door B, the operator inputs to the computer B-1, B-2, B-3 and B-4. Thus, at the conclusion of the steps illustrated in the flowchart 49 of FIG. 6, the doors containing the locks 20, 20 within the building site have been identified and their interrelationships described.

Figure 7:
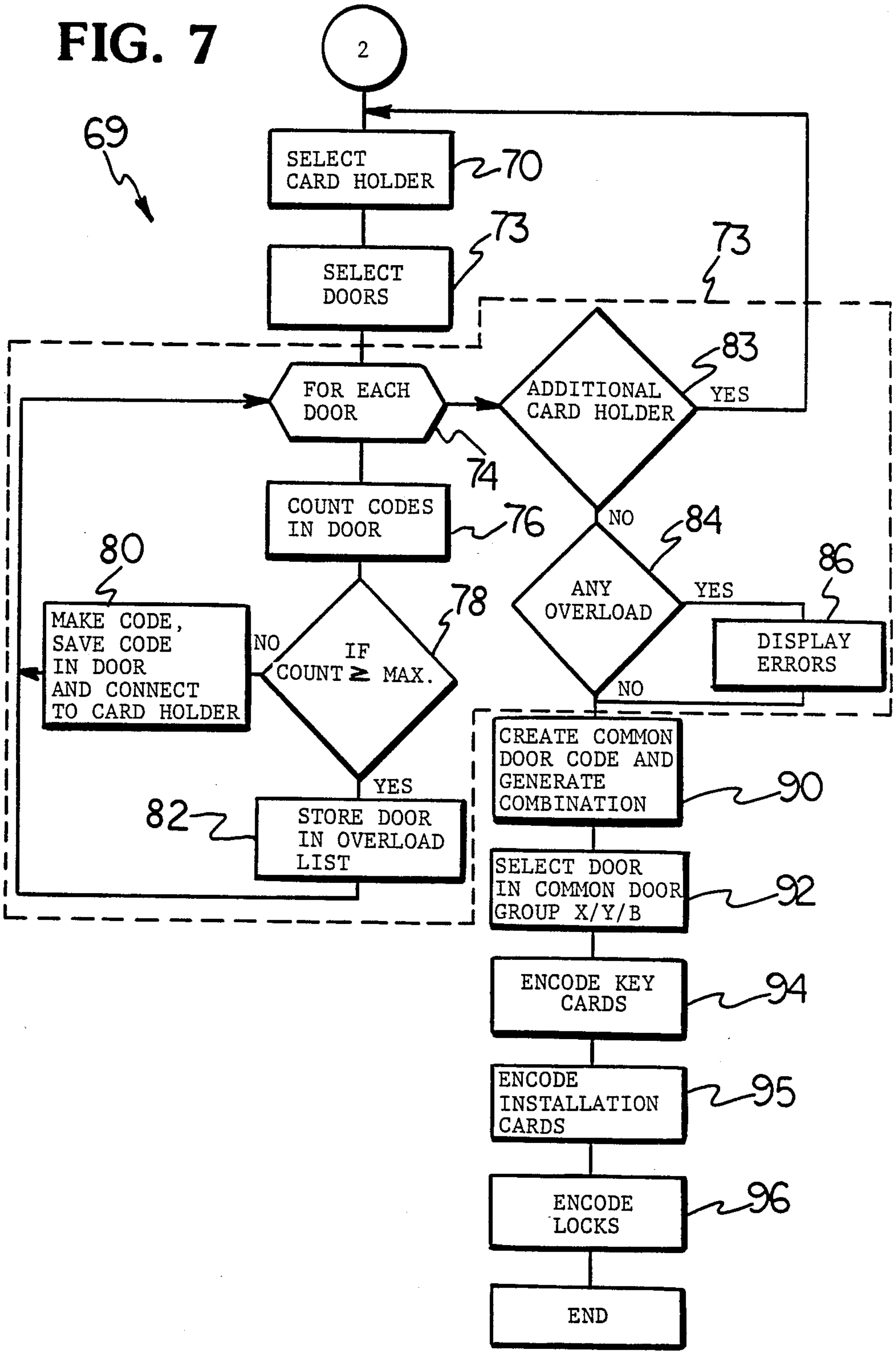
FIG. 7 is a flowchart including a computer algorithm illustrating a process by which the computer of FIG. 1 determines a coding arrangement for the key cards and electronic locks after the execution of the flowchart of FIG. 6.

FIG. 7 illustrates a flowchart 69 succeeding the flowchart 49 of FIG. 6 for determining suitable codes for the key cards 17, 17 and locks 20, 20 of a building site. First, the operator enters into the computer 6 the name of a card holder (step 70), for example, John. Next, the operator enters into the computer the doors through which John needs access (step 72), for example doors B and B-1 of Floor Y, Building X. Then the computer 6 executes an algorithm 73 illustrated within broken line in FIG. 7 in which, for each door (block 74), the computer first counts the number of previous card holders granted access through the door and adds one for the current card holder, John (step 76). Next, the computer determines whether the count computed in step 76 exceeds the maximum capacity of the lock memory of the electronic lock 20 on the door (step 78). In the illustrated example, each door lock can hold up to three lock combinations. This may be a real or assigned limit. Assuming that John was the first person granted access through doors B and B-1, the capacity for each of the locks 20 on the doors B and B-1 has not yet been exceeded. Consequently, the computer proceeds to step 80 in which it randomly generates a lock combination code b-1 for John's key card, notes that the code should be written into the individual code field 23 of John's future key card and notes the doors which should contain the combination code of John's key card, in this case, doors B and B-1. At this time, no code is designated to be written into the common pass door field 21 of John's card. The dedication of John's key card 17 to the locks of doors B and B-1 is schematically illustrated in FIG. 8. Next, the steps 70–80 are repeated for another card holder, Marty, who needs access through doors B and B-2. It should be noted that when the step 76 is executed in this round, the number of card holders which need access through door B has reached two (one below the limit) and the number for door B-2 is one. Because neither of the counts exceeds the capacity of the respective electronic locks 20, 20, another random number b-2 is generated for Marty for subsequent encoding in the individual code field 23 of her key card (step 80). At this time, no code is generated for subsequent encoding in the field 21. The dedication of Marty's key card 17 to the locks of doors B and B-2 is also schematically illustrated in FIG. 8. Next, the steps 70–80 are repeated for another key card holder, James, who needs access through door B and door B-3. It should be noted that in the step 76, the total number of people who need access through door B is three and the number for door B-3 is one, and because neither count exceeds the capacity of the respective electronic lock, the computer generates another random number, b-3, for James'card and earmarks it for encoding in the individual field 23 of James'key card (step 80). Also in step 80, the computer notes that the locks of the doors B and B-3 should later contain the code b-3 of the James' key card.

Next, the operator enters into the computer the name, Joe, of another key card holder (step 70) who needs access through doors B and B-4 (step 72). Then, the computer determines that four people now need access through the door B (step 76) and one person needs access through door B-4. There is no overload problem with the lock memory of the door B-4; however, as illustrated in FIG. 8 by the broken line marked "overload", a fourth code cannot be assigned to the door B because this would overload the lock combination memory 32 of the electronic lock 20 of door B. Consequently, the computer proceeds to step 80 for only the door B-4 and generates a random number b-4 for the individual code field 23 of Joe's key card and subsequent storage in the door B-4 and then proceeds to step 82 for the door B. In step 82, the computer notes (for subsequent processing) the fact that for door B, four key card holders, John, Marty, James and Joe, require access and this is an overload at the present time.

Assuming that the computer has completed the steps 74–82 for all of the key card holders and all of the doors (step 83), the computer proceeds to step 84 where it reviews its memory to determine if any overloads were noted in step 82 (step 84). Because such is the case with the door B of building X, floor Y, the computer displays on the monitor 12 the problem door and the names of the key card holders who need access through that door (step 86).

To meet the security needs of each of the key card holders, John, Marty, James and Joe, such that none of the other three card holders has access through the door of his or her private room, B-1, B-2, B-3 or B-4, and to ensure that no person other than John, Marty, James and Joe has access through the door B, the operator by suitable entry in the keyboard 14 assigns a common door group consisting of John, Marty, James and Joe. Consequently, the computer generates a random lock access combination or code b for the common door group (step 90). Next, the operator selects a door through which each member in the aforesaid common door group has access (step 92), in the aforesaid example, building X, floor Y, door B.

Alternately, the computer may be programmed to automatically assign John, Marty, James and Joe to the common door group having access to door B based on the fact that an attempt was made previously to grant each of them access through the door B. This programming utilizes the data stored in step 82 and in place of the steps 90 and 92, the computer automatically executes steps "Make Common Code" and "Assign Common Code to door B and cardholders John, Marty, James and Joe".

After the operator or computer makes the door selection for the common door group, the computer notes that the common door X/Y/B should later contain the lock access combination b for the common door group and also that the lock access combination b should be written into the common door field portion 21 of each of the key cards 17 of John, Marty, James and Joe. It should be noted that the aforesaid lock combinations b-1 through b-4 associated with the doors B-1 through B-4, respectively will still be written into the individual field portions 23, 23 of the key cards of John, Marty, James and Joe, respectively as illustrated in FIG. 9.

Next, the operator inserts blank key cards into the card encoder 8 of the management system 4, identifies each card by the name of the perspective card holder, John, Marty, James or Joe by a suitable entry in the keyboard 14 and directs the encoder to write lock combinations and other data on the key cards as illustrated in FIG. 9 (step 94).

Then, the operator inserts additional blank key cards into the card encoder 8 to be encoded and used as initialization cards. Each door lock requires one identification card and one lock combination installation card to initiate the lock. The identification card contains a unique identification number which is assigned to each lock and also contains a lock-type code which designates the door as being either an individual or a common door. For common doors, the identification number is stored in a common field portion of the card and for individual doors, the identification number is stored in an individual field portion of the card. The identification number and lock-type code are entered into memory of the respective door lock by insertion of the identification card into the lock. The lock combination initialization cards contain lock combinations which correspond to each lock combination necessary to operate the lock by the normal key cards 17, 17 and the identification numbers noted above. The lock combinations of these lock combination initialization cards are stored in either the fields 21 or 23 whichever corresponds to the type of lock. For example, if the lock is designated as a common lock, then the lock combinations of the lock combination initialization card is stored in the common field 21 of each card and the microprocessor within the lock is programmed to read and compare only the lock combination from the common field 21 and to ignore data, if any, within the individual field 23 of the key card. Similarly, if the lock is designated as an individual lock, then upon insertion of the normal key card 17, the microprocessor within the lock is programmed to read and compare only the data within the individual field portion 23. After the insertion of both cards for each lock, the locks are read for usage by the normal key cards 17, 17.

Processes by which the microprocessor within the lock recognizes the lock combination initialization cards (and subsequent normal key cards of actual users) as being suitable to update the locks' memory are known in the art and will not be discussed further except to say that in one previously known process, the microprocessor within the lock is programmed to initially compare one lock combination contained in the key card to a lock combination stored in the lock memory and if there is a match, proceed to change the lock combination stored in the lock memory to another lock combination stored on the key card. This type of updating process is disclosed in U.S. Pat. No. 4,511,946 to McGahan which issued on Apr. 16, 1985 and is hereby incorporated by reference as part of the present disclosure. If such an updating process was used, then the lock identification number can originally be used to put a code in the lock combination memory. The lock combination initialization card would be programmed with two combinations in the appropriate field portions, one combination matching the identification number and the other being used to update the lock combination (or in the alternative, the identification code can be used to provide a lock combination and the lock combination initialization card not used at all). Thereafter, key cards issued to John, Marty, James and Joe need only contain one code in each of the field portions 21 and 23 for regular, non-updating access through the respective doors until it is desired that the lock combinations be changed or may contain two identical codes in each portion. At which time, new key cards are issued to John, Marty, James and Joe which contain the previous lock combination of their previous cards and new lock combinations in one field portion.

It should also be noted that with the door B being designated a common pass door and the key cards having a separate common pass door lock access code, a single common pass door can provide access to an unlimited number of individual doors. However, in keeping with the objects of the invention, the common pass door arrangement is not utilized for locks accessible by a number of people less than the predetermined limit because in the common pass door arrangement whenever any one card is lost, the common pass code in the common pass door or doors must be changed and all the cards replaced, whereas in the non-common pass or "individual" door arrangement, if one card is lost, only that card need be replaced and the respective lock combination changed to maintain security.

FIG. 10 illustrates the floor plan of floor Z of the Geology building. An external door D equipped with an electronic lock 20 provides access to a hallway leading to three private rooms D-1, D-2 and D-3. Each of the private rooms is also equipped with an electronic lock 20. An operator executes the steps of the flowchart 49 of FIG. 6 to enter into the computer 6 the layout of the floor Z and then executes the flowchart 69 of FIG. 7 to encode the cards and designate lock access combinations for the doors D, D-1, D-2 and D-3. It should be noted that because there are only three internal doors, D-1, D-2 and D-3, and three card holders which need access through the door D, the RAM 32 of the electronic door lock 20 of the door D can hold three individual lock access combinations. Consequently, the step 78 in the algorithm 73 always leads to the step 80, there are no overloads and no common door groups. Then, according to the flowchart 69, the initialization and user key cards are encoded, the cards are inserted in the locks, and the locks are programmed to contain the lock combinations as follows: The electronic lock of the door D is also designated an "individual door" by the initialization identification card and contains three individual codes d-1, d-2 and d-3 in memory and no common door code, and key cards of three card holders Barbara, Pat and Jan, contain only an individual code, d-1, d-2 and d-3, respectively in the fields 23, 23 as illustrated in FIG. 11. When any of the cards of Barbara, Pat and Jan is inserted in the door D, the microprocessor 30 within the electronic lock compares the code in the individual fields 23, 23 of the card to all three of the lock access combinations in the RAM 32 and after noting a match, opens the lock. The doors, D-1, D-2 and D-3 are also designated as individual doors and the door D-1 contains the individual code d-1, the door D-2 contains the individual code d-2 and the door D-3 contains the individual code d-3. Consequently, when Barbara inserts her card in the door D-1, the microprocessor within the associated door lock compares the individual code d-1 to the individual code stored in its memory and after noting the match, opens the lock. Similarly, the individual code d-2 contained in Pat's card matches one of the individual codes in the door D and the sole individual code in the door D-2 giving Pat access through doors D and D-2. In an analogous manner, Jan's card contains the individual code d-3 which matches one of the individual codes stored in the electronic lock of the door D and also the sole individual code stored in the electronic lock of the door D-3 giving Jan access through the doors D and D-3.

One advantage of having the door D contain three individual codes, one associated uniquely with each of the internal doors D-1, D-2 or D-3 is that if one of the key cards is lost, only one new key card is required. Such a key card will change one combination in the door D, that of the lost card to that of the newly issued card, and the sole combination of the lock of the internal door for which the card was lost from that of the lost card to that of the new card. If the "lost" card is subsequently found by a thief, it will not provide access through any of the aforesaid doors D, D-1, D-2 or D-3. It should also be noted that because of the limited number of lock access combinations within the door D, the chance that a random card not belonging to Barbara, Pat or Jan will be capable of opening the door D is relatively small depending also on the number of code data bits of the lock access combination.

It should also be noted that if desired, the operator can make a common pass door group for the door D if desired (steps 90 and 92) even though such is not necessary.

By the foregoing, electronic locking systems embodying the present invention have been disclosed. However, numerous modifications and substitutions may be made without deviating from the scope of the invention. For example, the electronic locking system 10 may be adapted to a variety of floor plans in which card holders have access to a variety of doors. Also, if desired, two or more common door groups each with its own lock access code and group of key card holders may be assigned to the door D such that the memory of the door D contains the two or more lock access combinations identified as being common door codes and the cards of each common door group contain a lock access combination in the common door field 21 on the card common to the group and corresponding to one of the common door access combinations in the electronic lock of the door D.

Also if desired, the memory capacity of each electronic door lock may be increased beyond the aforesaid level of three access combination codes.

Also, if desired the RAM 32 within the locks may be programmed to contain a plurality of lock combinations per field for a plurality of access levels. Therefore, the invention has been disclosed by way of example and not limitation and reference should be made to the claims to determine the scope of the invention.

I claim:

1. An electronic locking system for a building having an external door leading to a plurality of internal doors, said electronic locking system comprising:

an electronic lock for said external door of said building, a plurality of locks associated respectively with said internal doors of the building accessed via said external door, the lock of each internal door including means for storing a unique lock combination and the lock of the external door including means for storing a common code, and a predetermined capacity of said unique lock combinations, a plurality of key cards readable by said electronic locks, each of said key cards being associated with said external door and one of said internal doors, and having an individual field region to store said unique lock combination to operate the associated internal door and a common code field region to store said common code to operate said external door, processing means for counting the number of unique lock combinations stored in the lock of the external door and for converting the unique lock combinations into a common code when the predetermined capacity of said unique lock combinations stored in said external door lock has been exceeded, and encoding means for encoding a unique lock combination in said individual field region and said common code into said common field region of said key cards.

* * * * *